Figure 1:
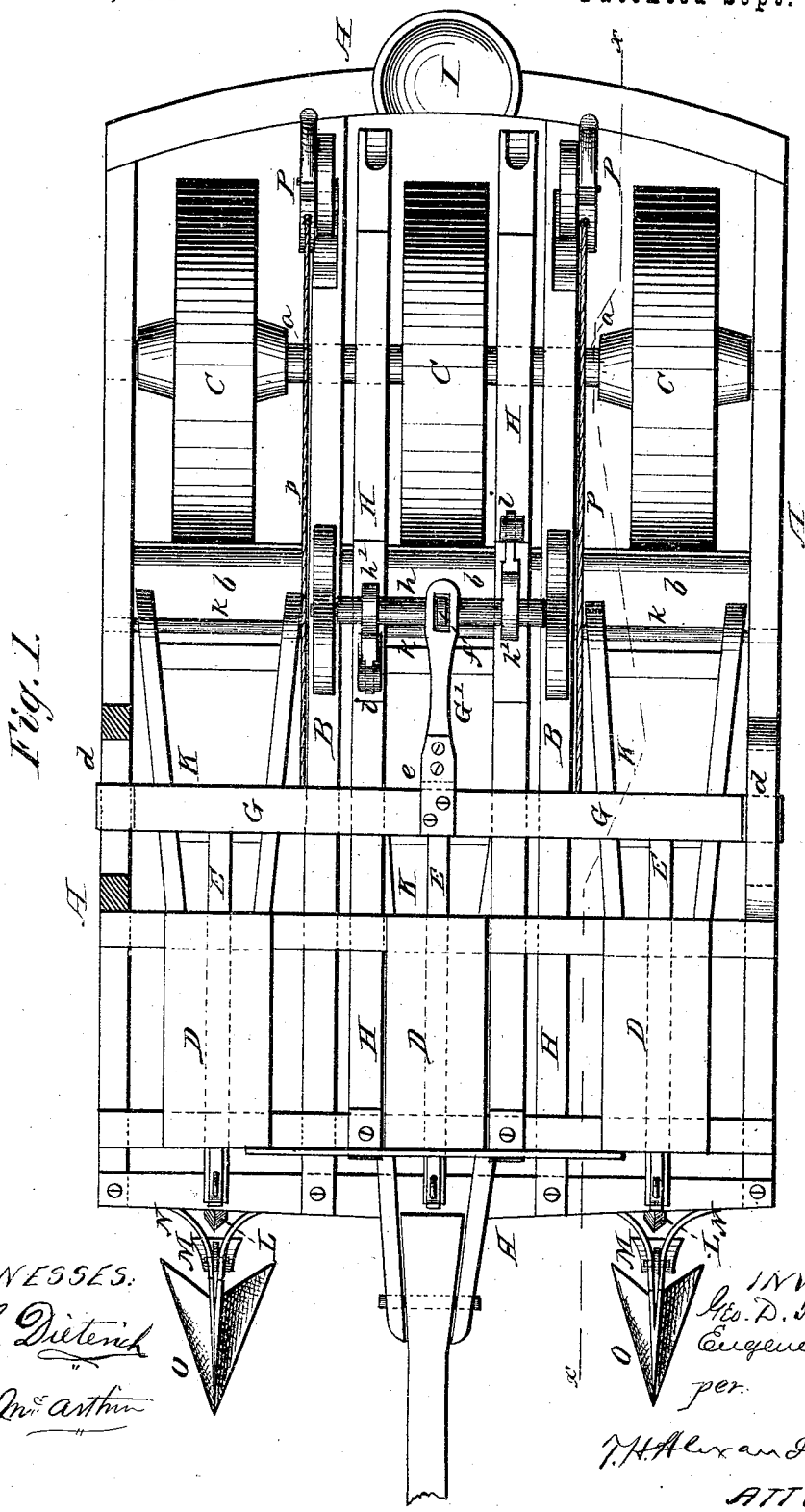

2 Sheets—Sheet 1.

G. D. FREDERICK & E. PECK.
CORN-PLANTER.

No. 181,932. Patented Sept. 5, 1876.

WITNESSES:
P. C. Dieterich
W. C. McArthur

INVENTORS
Geo. D. Frederick
Eugene Peck
per
T. H. Alexander
ATTORNEY.

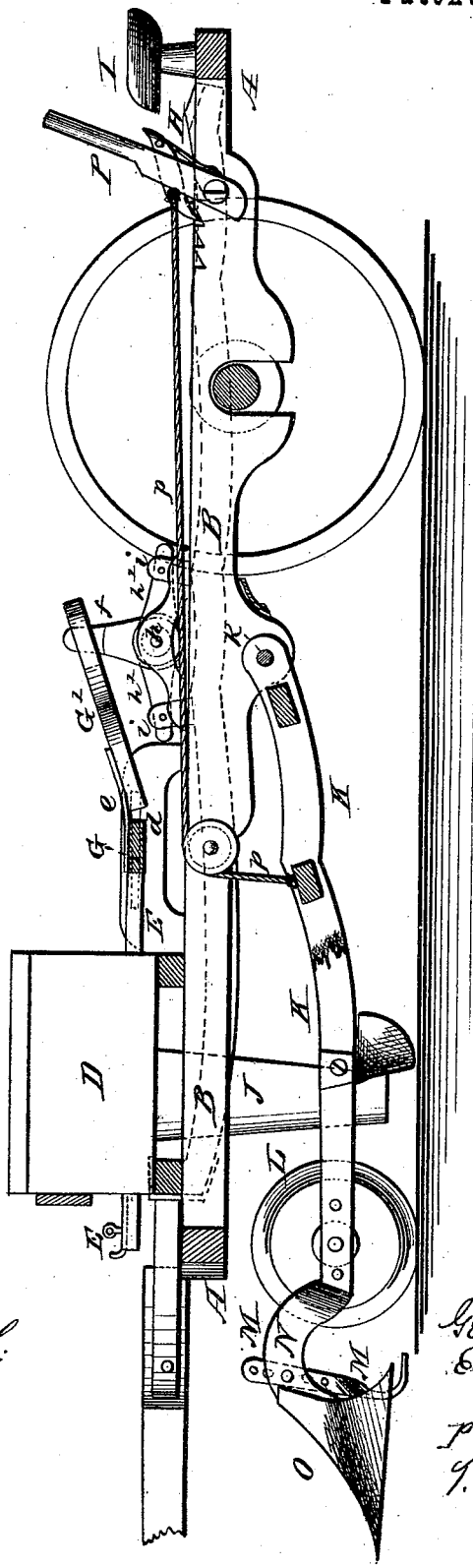

UNITED STATES PATENT OFFICE.

GEORGE D. FREDERICK AND EUGENE PECK, OF JUDA, WISCONSIN.

IMPROVEMENT IN CORN-PLANTERS.

Specification forming part of Letters Patent No. 181,932, dated September 5, 1876; application filed January 21, 1876.

*To all whom it may concern:*

Be it known that we, GEO. D. FREDERICK and EUGENE PECK, both of Juda, in the county of Green and State of Wisconsin, have invented certain new and useful Improvements in Corn-Planters; and we do hereby declare that the following is a full, clear, and exact description thereof, reference being had to the accompanying drawings, and to the letters of reference marked thereon, which form part of this specification.

The nature of our invention consists in the construction and arrangement of a corn-planter, as will be hereinafter more fully set forth.

In order to enable others skilled in the art to which our invention appertains to make and use the same, we will now proceed to describe its construction and operation, referring to the annexed drawings, in which—

Figure 1 is a plan view of our machine. Fig. 2 is a vertical section of the same through the line $x\,x$, Fig. 1.

A represents a rectangular frame, of any suitable dimensions, divided by two longitudinal bars, B B, into three equal spaces or parts, in each of which, near the rear end, is a broad wheel, C, said wheels being placed upon a common axle, $a$, and in front of each wheel is a scraper, $b$, attached to the main frame. On the front part of the frame A are secured three corn-boxes, D D D, in each of which is a dropping-slide, E, moving on a line longitudinal with the frame A. The three slides E are rigidly attached to a cross-head, G, in rear of the corn-boxes, said cross-head moving in guides $d\,d$ on the main frame A. To the center of this cross-head is, by a flexible joint, $e$, attached a bar, G′, which extends toward the rear, and has its rear end slotted and placed on an arm, $f$, that projects upward from a rocking shaft, $h$. Near the ends of the shaft $h$ are two arms, $h'\,h'$, extending from the same in opposite directions, and connected, by links $i\,i$, with two long treadles, H H, connected at their front ends, by flexible joints, to the front part of the frame, and extending rearward, so that their rear ends may be operated upon by the driver seated on the seat I in the center of the rear end of the frame. The driver is to press down these treadles alternately, by which means the dropping-slides E are moved back and forth at the proper times to drop three hills of corn at one time, the corn dropping down through ordinary chutes or conductors J.

In front of the wheels C passes a shaft, $k$, crosswise through the main frame, and on this shaft are hung three triangular frames, K, one in front of each wheel. In the front end of each frame K is mounted a beveled wheel, L, for opening the ground to receive the corn dropped through the chute or conductor J behind it. By the employment of these beveled wheels for opening the ground the machine will have lighter draft.

The wheels are regulated to run deeper or shallower in the ground by means of adjustable shoes M, arranged in curved arms N, projecting forward from the front ends of the frames K. These shoes run on the ground in front of the wheels L; and by the frames K being hung independent of each other they will allow the shoes and wheels to follow and accommodate themselves to all inequalities or unevenness of the ground, and thus plant all the hills of a uniform depth.

On the front ends of the curved arms N on each frame is secured a plow-shaped clearer, O, which simply clears all rubbish from off the row.

The frames K are raised and lowered at will by means of levers P, connected with the frames by cords $p$, passing over suitable pulleys on the main frame.

Having thus fully described our invention, what we claim as new, and desire to secure by Letters Patent, is—

The adjustable shoe M, in combination with the swinging frame K and the beveled wheel L, for the purposes herein set forth.

In testimony that we claim the foregoing as our own we affix our signatures in presence of two witnesses.

GEORGE D. $\times$ FREDERICK.
<small>his mark.</small>

EUGENE PECK.

Witnesses:
M. H. PENGRA,
H. A. WILLIAMS.